(12) United States Patent
Perchant et al.

(10) Patent No.: US 7,903,848 B2
(45) Date of Patent: Mar. 8, 2011

(54) METHOD FOR PROCESSING AN IMAGE ACQUIRED THROUGH A GUIDE CONSISTING OF A PLURALITY OF OPTICAL FIBERS

(75) Inventors: Aymeric Perchant, Paris (FR); Georges Le Goualher, La Meziere (FR); Frederic Berier, Courbevoie (FR)

(73) Assignee: Mauna Kea Technologies, Paris (FR)

( * ) Notice: Subject to any disclaimer, the term of this patent is extended or adjusted under 35 U.S.C. 154(b) by 1152 days.

(21) Appl. No.: 10/520,917

(22) PCT Filed: Jul. 11, 2003

(86) PCT No.: PCT/FR03/02197
§ 371 (c)(1),
(2), (4) Date: Jan. 11, 2005

(87) PCT Pub. No.: WO2004/010377
PCT Pub. Date: Jan. 29, 2004

(65) Prior Publication Data
US 2005/0207668 A1    Sep. 22, 2005

(30) Foreign Application Priority Data
Jul. 18, 2002 (FR) .................... 02 09100

(51) Int. Cl.
G02B 6/06 (2006.01)
G06K 9/00 (2006.01)
G06K 9/36 (2006.01)
H04N 13/02 (2006.01)
H04N 5/00 (2006.01)

(52) U.S. Cl. ........... 382/128; 382/284; 348/48; 348/615; 385/117

(58) Field of Classification Search .................. 382/128, 382/199, 254, 265, 267, 275, 299, 288; 348/65, 348/69, 88; 600/180
See application file for complete search history.

(56) References Cited

U.S. PATENT DOCUMENTS 4,480,636 A * 11/1984 Karaki et al. ................. 600/109
4,926,257 A *  5/1990 Miyazaki ........................ 348/45
(Continued)

FOREIGN PATENT DOCUMENTS

JP    08191439 A    7/1996
(Continued)

OTHER PUBLICATIONS

Haneishi et al "A New Method for Distortion Correction of Electronic Endoscope Images", IEEE Transactions on Medical Imaging, vol. 14, No. 3. Sep. 1995.*
(Continued)

*Primary Examiner* — Vu Le
*Assistant Examiner* — Andrae S Allison
(74) *Attorney, Agent, or Firm* — Osha • Liang LLP

(57) ABSTRACT

A method for processing an image acquired through a guide consisting of a plurality of optical fibers includes, for each optical fiber, isolating on the acquired image a zone corresponding to the optical fiber, locally processing each zone individually to correct the photon flux detected in each optical fiber, then reconstructing the acquired image by eliminating the pattern caused by the optical fiber. The method also includes a sampling process for obtaining, for each optical fiber and from a sampling image, a sample injection rate which can be used for reconstructing the acquired images. The method also includes a prior step which consists in detecting the fibers from a target.

34 Claims, 2 Drawing Sheets

U.S. PATENT DOCUMENTS

| | | | | |
|---|---|---|---|---|
| 5,257,100 | A | * 10/1993 | Hattori et al. | 348/65 |
| 5,764,809 | A | * 6/1998 | Nomami et al. | 382/284 |
| 5,878,159 | A | * 3/1999 | Taleblou et al. | 382/128 |
| 6,080,104 | A | * 6/2000 | Ozawa et al. | 600/180 |
| 6,157,748 | A | * 12/2000 | Taleblou et al. | 382/288 |
| 6,190,308 | B1 | * 2/2001 | Irion et al. | 600/109 |
| 6,885,801 | B1 | * 4/2005 | Shankar et al. | 385/117 |

FOREIGN PATENT DOCUMENTS

| | | |
|---|---|---|
| WO | WO 97/42600 | 11/1997 |

OTHER PUBLICATIONS

Wei Ii et al "Enlargement and Enhancement of Electronic Endoscopic Images Based on Recursive Minimum-maximum Method", Proceedings of SPIE—vol. 4224, Biomedical Photonics and Optoelectronic Imaging, Hong Liu, Qingming Luo, Editors, Oct. 2000, pp. 55-59.*

Dejjenova, "Active contours in segmentation of fiber like objects", <http://www.bmf.hu/conferences/SAMI2005/demjenova.pdf>.*

Haris et al, "Hybrid Image Segmentation Using Watersheds and Fast Region Merging", IEEE Transactions on Image Processing, vol. 7, No. 12, Dec. 1998.*

Zhang, Chao et al.: "Nonlinear Distortion Correction in Endoscopic Video Images", IEEE Transactions on Medical Imaging, vol. 2, Sep. 10, 2000, pp. 439-442, XP-010530017.

Patent Abstracts of Japan, Publication No. 08-191439, Publication Date: Jul. 23, 1996, 24 pages.

Office Action in Japanese Patent Application No. 2004-522235, mailed Apr. 21, 2009, and English translation thereof, 5 pages.

* cited by examiner

METHOD FOR PROCESSING AN IMAGE ACQUIRED THROUGH A GUIDE CONSISTING OF A PLURALITY OF OPTICAL FIBERS

BACKGROUND OF THE INVENTION

The present invention relates to a method for processing an image acquired by means of a guide consisting of a plurality of optical fibres. It finds a particularly advantageous application in the field of medical imaging. However the invention has a broader scope because it can apply to any field in which imaging is carried out by means of a guide consisting of a plurality of optical fibres. The image guide allows an image to be obtained. Such an apparatus allows the laser scanning and the light source and the receiver to be shifted well away from the object which is to be observed. For example in a laser scanning system in which a confocal image is obtained, the image guide is an assembly of several thousand optical fibres whose spatial arrangement is identical at the entrance and at the exit. The observation of an object through this guide could be compared to an observation via a grid, because of the loss of information between the optical fibres. The display is therefore hampered because of the presence of the optical fibres: the pattern of the optical fibres appears on the acquired image. This necessitates specific processing so as to eliminate this pattern and improve the readability of the image.

In current systems, this specific processing is limited to a linear filtering of the acquired image.

The present invention aims to propose a new method allowing the images acquired by means of an optical multi-fibres guide to be rendered readable.

SUMMARY OF THE INVENTION

Another aim of the invention is to take into account the parasite effects due to the acquisition apparatus in the processing of the acquired image.

At least one of the above-mentioned objectives is achieved with a new method for processing an image acquired by means of a guide made up of a plurality of optical fibres. According to the invention, for each optical fibre, a zone corresponding to this optical fibre is isolated on the acquired image, each zone is locally processed individually, then the acquired image is reconstructed eliminating the pattern due to the optical fibres.

With the method according to the invention, the isolation of the optical fibres on the image comes down to the isolation on the image of the zone corresponding to each fibre. When the pixels representing the majority injection in terms of surface (zone of influence) into a fibre are isolated, local processing can then be carried out on each optical fibre. The low crosstalk of the guide and settings of the injection make it possible to guarantee that the information content of each fibre does not depend on the neighbouring fibre but only on the spatial coherence of the observed object. The apparatus carrying out the image acquisition is set so as to have enough pixels per fibre: the information which is detected by this fibre and which is distributed over the pixels representing the optical fibre can thus be precisely estimated.

Thus, instead of processing the image globally by realizing a simple linear filtering as in the prior art, in the method according to the invention each optical fibre is isolated on the acquired image and the information detected by each optical fibre is processed. Advantageously, the apparatus carrying out the image acquisition is monitored in order to guarantee the minimum-efficiency conditions of the method according to the invention. For this, the sampling rate, the quality of the injection into the optical fibres, and the setting of the detection chain can be modified in order to guarantee an "egg box" type profile, in particular on the reference image.

Advantageously, when the optical fibres are isolated on the image and when each isolated zone is processed, numerous applications can be envisaged such as:

reconstruction of an image without the pattern of the fibres: the fibres hamper readability and the subsequent processing carried out on the image;

monitoring of the roughness of the surface of the guide, the roughness will disturb the injection phenomenon, and make it spatially variant;

re-setting of the images, or the stabilization of the image; the pattern of the fibres prevents any re-setting of the images relative to each other, knowledge of the position of the fibres and of the observed information allowing the images to be aligned;

super-resolution: small movements can be used in the acquisition of a sequence of images in order to resample the images with a smaller spatial period, and therefore to obtain a better resolution;

quantization of the images: information about the image can be extracted much more easily and precisely without the pattern of the optical fibres, the temporal control of the internal parameters of the acquisition apparatus: knowledge of the position of each fibre and of their optimum injection values allows monitoring of the wear on the guide, and the variations of certain optoelectronic parameters.

In the method according to the invention, in order to isolate each zone, a mask, corresponding to the pattern of the fibres, can be applied to the acquired image. This mask, corresponding to an image of the related components representing each fibre, is obtained during a stage of detecting the fibres from a reference image.

The reference image is an image allowing the optical fibres to be well distinguished from each other. It may have come from the observation of a mirror, a homogeneous scattering medium, a homogeneous fluorescent medium, it may also come from the backscattering peculiar to the inside of the bundle of optical fibres. But it can also be the acquired image. On leaving the detection stage, an image of the related components (segments) representing each optical fibre is therefore obtained. Each grey level represents a single index denoting an optical fibre in the guide.

According to the invention, the stage of detecting the fibres can comprise the following stages:

prefiltering of the reference image, segmentation by region, using the "watershed" algorithm, named here LPE correction of segments having an abnormally large surface, and correction of segments having an abnormally small surface.

The two corrections stages are interchangeable, and they can be carried out in an iterative way.

Advantageously, the prefiltering stage can comprise a morphological opening stage followed by an image-inversion stage. The digital morphological opening is used in order to seek to eliminate the parasite maxima situated on the optical fibres. This is a standard preprocessing of the LPE "watershed" algorithm carried out during the segmentation by regions.

At output of the prefiltering stage, an image is obtained of the optical fibres filtered free of their local maxima, and smoothed at the interfibre zones.

The image-inversion stage can be preceded by a scalar-type anisotropic scattering stage.

According to the invention, the prefiltering can also comprise a stage during which an interpolation to the nearest neighbour is carried out in order to double the size of the image vertically and horizontally.

With this interpolation stage, it is sought to simulate mathematical morphology structuring elements with a radius less than one. The image is doubled so that the following morphological opening does not affect the isolated maxima, but only those which are 8-related, but not 4-related (diagonal neighbours). The benefit is a selection of the maxima eliminated by the opening.

Moreover, in the presence of a plurality of acquisition images, the prefiltering can also comprise a stage of temporal filtering.

Advantageously, the local processing of each zone can consist of calculating the photon flux detected for each zone (corresponding to a given fibre) of the acquired image, and correcting the bias on each thus-calculated flux value.

Preferably, the calculation of the flux is calculated using an estimator of maximum likelihood calculated on a specific injection profile of each fibre. More precisely, the maximum likelihood estimator can be used on the amplitude distribution of the specific injection profile in each optical fibre. The profile is a curve representing the injection rate as a function of the distance of the light from the centre of the transverse section at the end of the optical fibre. This profile is often modelized by a Gaussian filtering.

According to an embodiment of the invention, also applying the mask to an image representing a parasite background, the photon flux detected for each zone of the background image is also calculated, and the flux value of each zone of the corresponding background image is subtracted from each flux value of each zone of the acquired image and the bias correction is carried out on the result of this subtraction.

The background image can be parasite reflections on the optical systems of the acquisition apparatus, thus including those at the exit of the image guide, but it can also be the offset, the electronic noise, of the digitizing chain of the acquisition apparatus. If the offset is dominant on the image, the background cannot be obtained by simply removing the image, because the offset depends on the content, and is therefore no longer the same. In this case, a quantile of the histogram is used to estimate it. The histogram is that of the image acquired during the real-time measurement and that of an adjustment image during an adjustment stage as will be seen below.

The parasite background can come from the background image or from an offset of the detection chain.

According to the invention, the bias correction can consist of the spatial separation of the fibres into different blocks, the estimation of the bias value in each block, the interpolation of the bias values so as to obtain a bias value for each fibre, and the division, for each zone, of the flux value obtained in the preceding stage by the thus-obtained value for corresponding bias.

The reconstruction of the acquired image can involve a calibration stage in order to calibrate the flux of the acquired image, after local processing, and a mosaic reconstruction stage. Other types of reconstruction can be used, such as by interpolation or with bases of radial functions.

Moreover, the present invention can be implemented without the adjustment and calibration stages. In this case, the reference image can be the acquired image.

For the calibration and for each zone of the acquired image, the flux value obtained after local processing can be divided by a flux value obtained following an adjustment stage. This division operation allows compensation for the wrong injections into some optical fibres.

According to an advantageous characteristic of the invention, the adjustment stage consists of:
  isolating each zone of an adjustment image by applying the mask, corresponding to the pattern of the fibres, to this adjustment image,
  calculating the photon flux detected for each zone of the adjustment image, and
  correcting the bias on each thus-calculated flux value.

The image obtained upon completion of the adjustment can serve as a standard for the acquired image so as to obtain an acquired image for which all of the optical fibres of the guide would have been injected in the same way.

Preferably, the flux is calculated using an estimator of maximum likelihood calculated on the specific injection profile of each fibre. Moreover, also applying the mask to an image representing a parasite background, the photon flux detected for each zone of the background image can be calculated, the flux value of each zone of the corresponding background image can be subtracted from each flux value of each zone of the adjustment image, and the bias correction can be carried out on the result of this subtraction.

In other words, during the adjustment stage, the same operations are carried out as during the measurement, i.e. during the processing of an image acquired in real time. Except that, for the adjustment an adjustment image is used which broadly shows the pattern of the optical fibres. The adjustment allows, after detection of the fibres on the reference image, the generation of an image in which the injection rate will serve as a standard during the real-time measurement. During the measurement, the injection rate is also corrected on the acquired image, and the observed flux is calibrated as a function of the standard image so as to reconstruct an acquired image without the pattern of the optical fibres.

By bias is meant a low-frequency component, this component being able to result from various causes.

The bias correction can be carried out during the adjustment and during the real-time measurement. In the first case, this can be because the adjustment takes place for example on a plane mirror, and because the field curvature will reduce the injection quality upon the return to the edges (which are out of focus). On the measurement object, or in a homogeneous scattering medium, the injection remains less satisfactory on the edges, and this manifests itself in a bias which is similar to the first as regards its form. The bias can also be caused by a vignetting problem. Generally, the bias has an almost circular symmetry. The bias is actually estimated by dividing the image into N×N blocks of fixed size, then estimating the bias on each block. For this it is necessary to consider the nature of the observed object. In the case of a homogeneous object, the bias can be acquired by taking the average or median value over the block. When there is an object, it is necessary to know whether this object is darker or lighter than the rest of the image. By way of example, the bias can be multiplicative, and therefore an average or median operator is more likely taken (compared to a maximum or minimum for an additive bias). Thus an image measuring N×N is obtained which is used, after interpolation, to find the bias value seen by each fibre. A bilinear interpolation can be used for example.

The mosaic reconstruction can consist of distributing, over the whole surface of each zone of the acquired image, the flux value of each zone obtained following the calibration stage. Then a low-pass recursive filtering can be carried out so as to smooth the reconstructed acquired image.

According to an advantageous embodiment of the invention, the reference image and the adjustment image are identical.

BRIEF DESCRIPTION OF THE DRAWINGS

Other advantages and characteristics of the invention will become apparent when examining the detailed description of an embodiment which is in no way limitative, and the attached drawings, in which.

DETAILED DESCRIPTION

Figure 1:
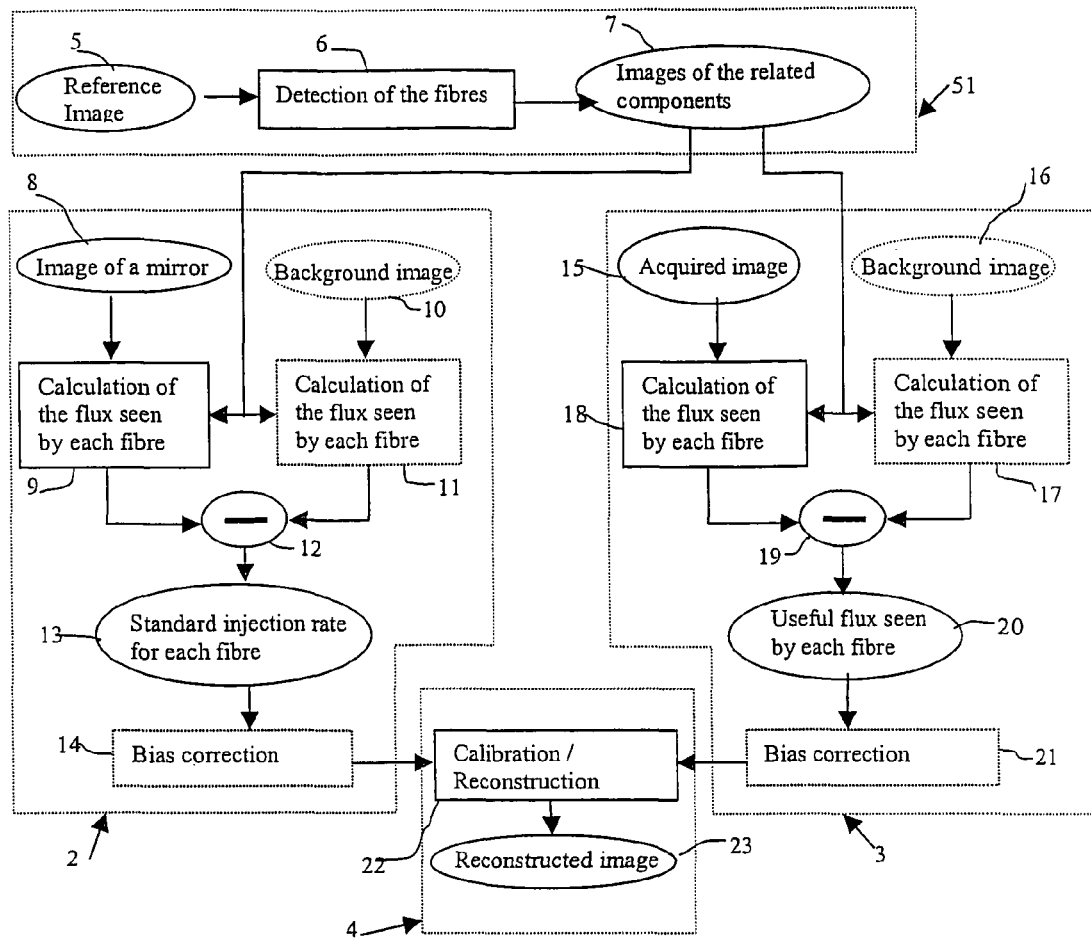
FIG. 1 is a global schematic view of the image-processing method according to the invention.

In FIG. 1 a global diagram of the method according to the invention is represented.

The method can be divided into four parts: a part 1 relating to the detection of the fibres, an adjustment part 2, a measurement part 3, and a reconstruction part 4. Parts 1 and 2 correspond to the diagram of FIG. 2, while part 3 corresponds to the diagram of FIG. 3 and part 4 corresponds to the diagram of FIG. 4.

In FIG. 1, according to the invention, when it is wished to acquire a series of images, an adjustment stage is carried out first of all. For this, a reference image 5 is considered which is subjected to a stage of detecting the fibres 6 so as to obtain an image 7 of the related components representing each fibre. The reference image 5 is an image acquired by means of a system comprising a guide constituted by a plurality of optical fibres, for example from 10 000 to 30 000. The reference image 5 is obtained such that the pattern of the optical fibres is distinguished, i.e. of the "egg box" type: on the profile of the image, a fibre which manifests itself in a small mountain surrounded by a col and a valley. The reference image 5 undergoes an operation of detecting the fibres so as to obtain a sort of mask representing the pattern of the optical fibres. This mask is the image of the related components representing each fibre. Each grey level represents a single index denoting an optical fibre in the guide.

The image 7 is then used for the adjustment 2 of the image acquisition system. The adjustment aims to determine an image of the fibre-by-fibre photons injection rates. This adjustment stage is necessary in so far as each fibre has slightly different physical properties from the other fibres. There is thus a certain disparity regarding the ability of each optical fibre to convey the same photon flux.

In order to carry out the adjustment 2, an image 8 is considered, hereafter called mirror image, obtained by placing the mirror in front of the optical system of the image guide. This image can also be that of a homogeneous scattering medium, a homogeneous fluorescent medium or of the back-scattering peculiar to the interior of the bundle of optical fibres. This image 8 can also be the same image as is used in 5, i.e. the reference image. The mask 7 is used to determine the photon flux of the mirror image 8 seen by each optical fibre during stage 9. Optionally, the photon flux seen by each fibre during stage 11 can also be determined for a parasite background image 10. This image 10 can correspond to parasite reflections on the optics of the acquisition system, but also to the offset and/or the electronic noise due to the digitizing chain of the acquisition system. The flux calculation of stage 11 also involves the mask 7 so as to identify the zone corresponding to each fibre. In stage 12, for each optical fibre, the photon value of the mirror image 8 is subtracted by the photon flux value of the background image 10. In stage 13 it is estimated that, for each optical fibre, the difference obtained in stage 12 corresponds to the standard injection rate for each fibre (stage 13).

In stage 14, a bias correction is carried out on the image of stage 13. The image resulting from stage 14 is therefore an image presenting, for each zone corresponding to an optical fibre, a standard and corrected photon flux value. This image resulting from stage 14 will serve as a reference for a series of images acquired in real time by the acquisition system. The images acquired and processed in real time undergo the processing illustrated in parts 3 and 4.

The measurement part 3 receives an acquired image 15, typically the image of a measurement object. As realized in the adjustment part 2, the photon flux seen by each fibre is also calculated here in stage 18 as regards the acquired image 15. For this, the mask 7 is used so as to identify, on the acquired image 15, the zone corresponding to each optical fibre. Optionally, a parasite background image 16 is considered as previously, which can be a real image, i.e. corresponding to the background of the acquired image 15, or an estimated image corresponding to the noise of the acquisition system. This background image 16 also undergoes a stage 17 using the mask 7 so as to determine the photon flux seen by each fibre. In stage 19 a subtraction is carried out. The result of the subtraction is an image presenting, for each zone corresponding to a given optical fibre, a useable photon flux. Stage 21 is an optional stage during which a bias correction is carried out on the image 20.

The reconstruction part 4 receives on the one hand the corrected image 20 and on the other hand the corrected (debiased) image 13 so as to carry out a calibration operation 22, dividing the flux of the observed object (element resulting from stage 21) by the standard fluxes (element resulting from stage 14). In stage 22 a reconstruction is also carried out so as to obtain a reconstructed image 23 without a pattern of the visible optical fibres.

Figure 2:
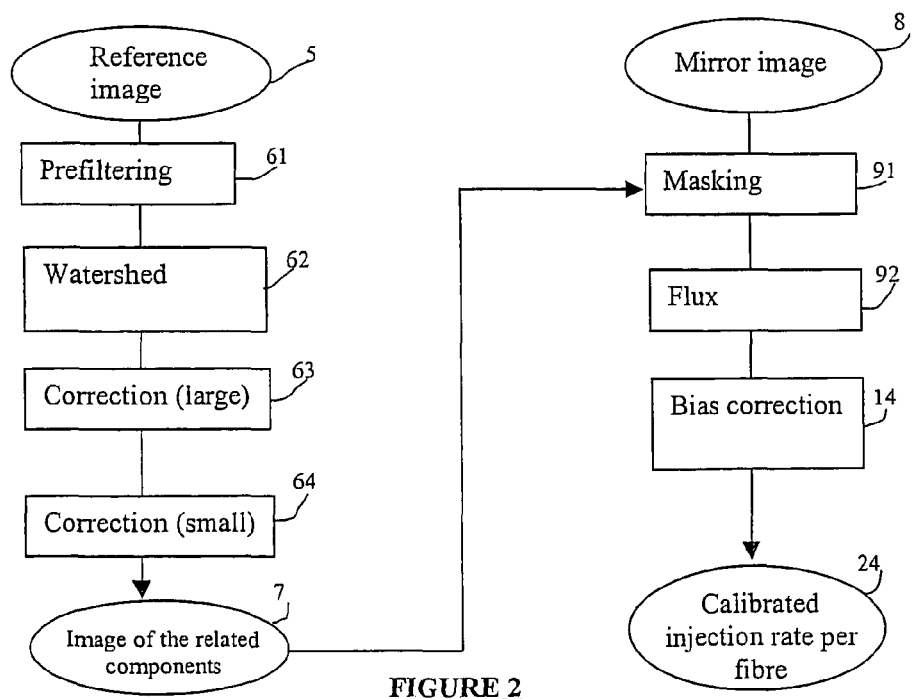
FIG. 2 is an flow chart detailing the main stages of an adjustment method according to the invention.

In FIG. 2 the method 1 of detecting the fibres and the adjustment method 2 are seen in more detail. The operation 6 of detecting the fibres involves four operations:

a prefiltering, a LPE "watershed" corresponding to a segmentation by region;

a correction of the segments having an abnormally large surface; and a correction of the segments having an abnormally small surface.

The two correction operations are interchangeable, and they can also be carried out in a loop.

The prefiltering operation 61 receives the reference image 5 at the entry and generates an image of the fibres filtered free of these local maxima and smoothed at the interfibre zones. The prefiltering involves a morphological opening operation, optionally followed by a scalar-type anisotropic scattering, then by an inversion of the image. When there are several images of the same fixed object, a temporal filtering of the images can be carried out. An interpolation to the nearest neighbour can also be carried out in order to double the size of the image vertically and horizontally.

The image generated by the prefiltering 61 then undergoes a watershed operation 62, allowing an image to be obtained from the related components of the detected fibres. The watershed operation, of the conventional type, will allow segments located at the edge of the image to be marked so as to remove them from the final result. The characteristics of these obtained segments (average size, standard deviation, proximity) are then calculated. The image resulting from the operation 62 will undergo two successive corrections 63 and 64. The operation 63 is a correction of the segments having an abnormally large surface. For this, the segments which are both too large relative to an average size and have too many neighbours relative to a normal surface of the fibres are selected. These segments are resegmented with a watershed either on the original image or on a distance card image inside the detected segments (in a segment, distance between each pixel and the edge of the segment). The characteristics of the obtained segments (average size, standard deviation of the sizes) are then calculated.

In stage 64, the segments having an abnormally small surface are corrected. The adjacency graph of segments is also calculated, then it is decided which fibres must be fused and which are just candidates. In every case, the set of possible fusions is the set of fusions with each neighbour. For the fibres which must be fused, the possible fusion is taken which gives the smallest density value. For the others which are only candidates, three filters are used successively to eliminate the fusions which produce wrong results. The first filter checks that the size after fusion is not too large. The second filter checks that the density after fusion does not exceed a maximum value. The last filter checks that the fusion improves density. If several fusions remain, those are retained which produce a better density result (the smallest). Once all the fusions have been carried out on the adjacency graph, the results are reflected onto the image of the related components, at the exit. The characteristics of the obtained segments (average size, standard deviation of the sizes) are then calculated. The second correction 64 allows the generation of the image of the related components which will serve as a mask for the adjustment 2 and the measurement 3.

The right-hand part of FIG. 2 relates to an adjustment method 2 as represented in FIG. 1 but in a simplified manner. The optional operations 10 and 11 do not appear in FIG. 2.

The masking stage 91 consists of marking, on the mirror image 8, the zone or surface corresponding to each optical fibre of the guide. The image 7 of the related components serves as a mask. In stage 92, the flux coming from the observed object is calculated for each optical fibre. The flux is calculated using the estimator of the maximum likelihood determined on the specific injection profile of each optical fibre. In stage 14, a bias correction is carried out as will be seen in more detail in FIG. 3. At output of stage 14, a standard value of the photons injection rate is obtained in stage 24 for each optical fibre.

Figure 3:
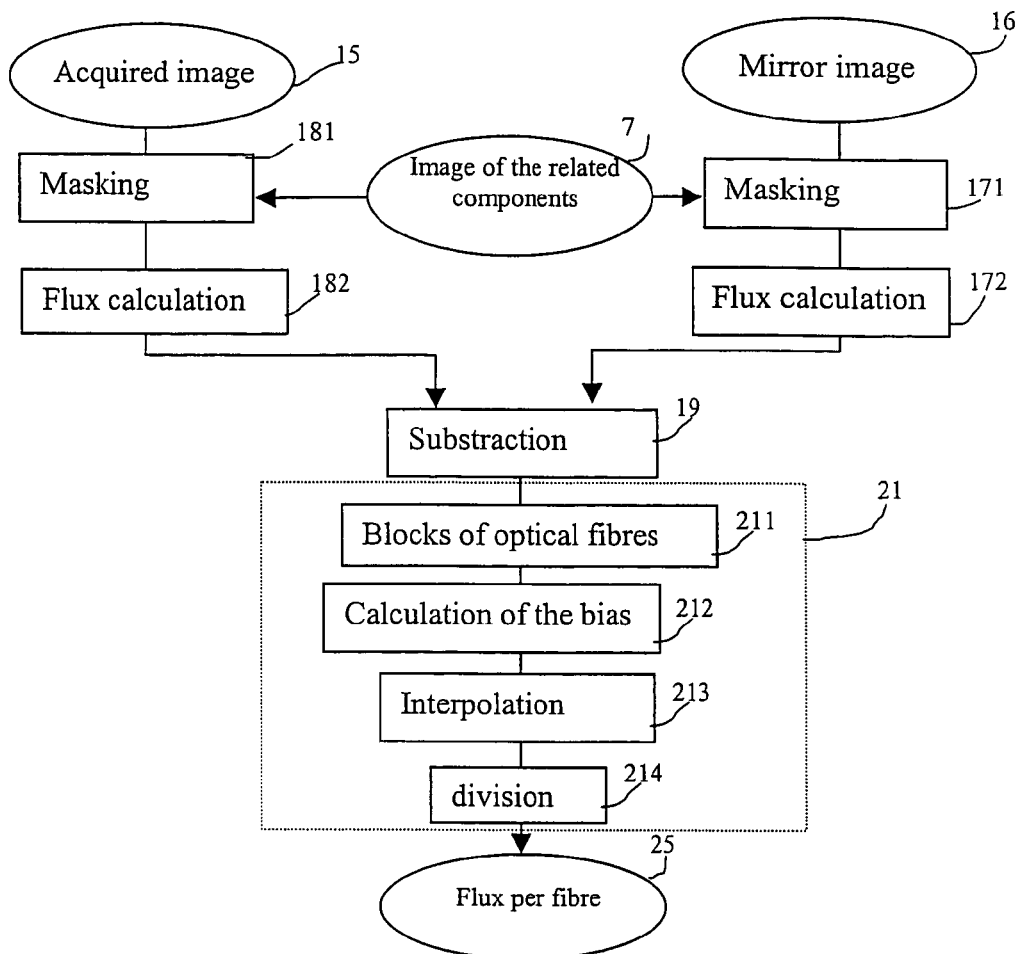
FIG. 3 is an flow chart detailing the main stages of a measurement method according to the invention.
Figure 4:
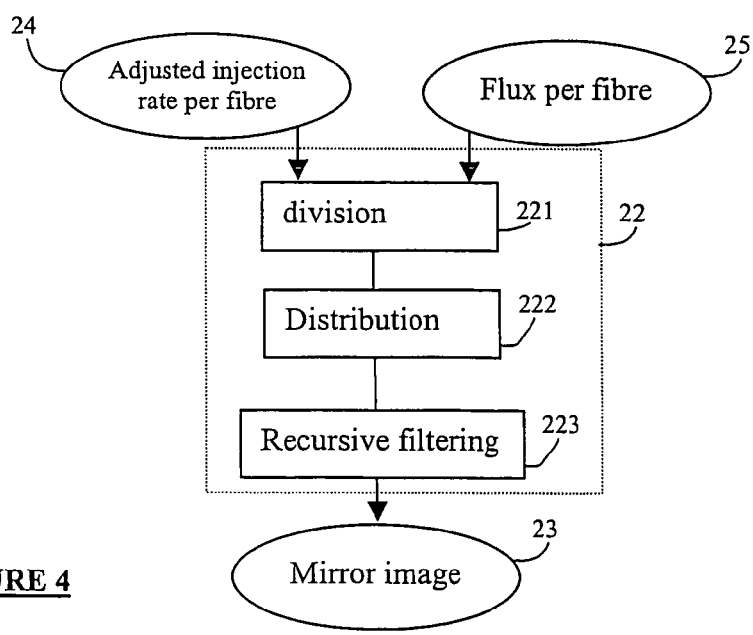
FIG. 4 is an flow chart detailing the final stages taking into account the adjustment and measurement methods for the reconstruction of an acquired image without visible optical fibres according to the invention.

FIG. 3 shows, the measurement method according to the invention. This method takes place in real time. On the acquired image 15, the zone corresponding to each optical fibre is marked by carrying out a masking operation 181 using the mask 7. In stage 182, the flux coming from the observed object is then calculated for each fibre. As previously, the calculation is carried out using the estimator of the maximum likelihood determined on the specific injection profile of each optical fibre. The same operations of masking 171 and flux calculation 172 are carried out on a parasite background image 16.

In stage 19, for each zone corresponding to an optical fibre, the background flux (172) is subtracted from the flux of the acquired image (182).

If the background image is not supplied and this background exists, it must be subtracted, an offset and/or electronic noise of the measurement system being calculated using a quantile on the histogram of the acquired image 15.

Then in stage 21 a bias correction can be carried out on the image resulting from the subtraction 19. In this case, in stage 211 the zones corresponding to the fibres are spatially separated into different blocks. In stage 212, the bias value is calculated in each of these blocks using a given operator. Then in stage 213, the bias values are interpolated in order to obtain a value for each fibre. Then in stage 214 the flux value seen by each fibre is divided by the value of the bias obtained.

At the end of stage 21, an image 25 is generated representing the flux observed for each fibre.

The final reconstruction stage takes into account the image of the standard injection rate 24 and the image of the observed flux 25. The calibration operation aims to compensate for the injection losses by equalizing the injection rate of all the optical fibres so as to have an image all the fibres of which have been injected in the same way. For this, in stage 221 the observed image flux 25 is divided by the image of the injection rate 24.

A mosaic reconstruction is then carried out by distributing, in stage 222, over the whole of the surface corresponding to each fibre, the value obtained after calibration (division). In order to produce a more regular appearance, a Gaussian low-pass filtering 223 can be carried out for example.

Of course, the invention is not limited to the examples which have just been described and numerous changes can be made to these examples without going beyond the scope of the invention.

The invention claimed is:

1. A method for processing an image acquired by means of a guide consisting of a plurality of optical fibres, comprising:
    for each optical fibre, isolating a zone corresponding to the optical fibre on the acquired image,
    wherein each zone is locally processed individually by:
        calculating a flux for each zone on the acquired image,
        calculating a flux for each of a plurality of zones on a set of reference images comprising a parasite background image and an adjustment image, and
        calibrating the fluxes of the acquired image using the fluxes of the set of reference images; and
    reconstructing the acquired image from the calibrated fluxes of the acquired image so as to eliminate a pattern due to the optical fibres.

2. The method according to claim 1, wherein, in order to isolate each zone, a mask, corresponding to the pattern of the fibres, is applied to the acquired image.

3. The method according to claim 2, wherein the mask, corresponding to an image of related components representing each fibre, is obtained during a stage of detecting the fibres from a reference image.

4. The method according to claim 3, wherein the stage of detecting the fibres comprises the following stages:
    prefiltering of the reference image,
    segmentation by region,
    correction of segments having an abnormally large surface, and
    correction of segments having an abnormally small surface.

5. The method according to claim 4, wherein the two corrections stages are interchangeable.

6. The method according to claim 4, wherein the two corrections stages are carried out in an iterative way.

7. The method according to claim 4, wherein the prefiltering stage comprises a morphological opening stage followed by an image-inversion stage.

8. The method according to claim 7, wherein the image-inversion stage is preceded by a scalar-type anisotropic scattering stage.

9. The method according to claim 4, wherein the prefiltering also comprises a stage during which an interpolation to the nearest neighbour is carried out in order to double the size of the image vertically and horizontally.

10. The method according to claim 4, wherein, in the presence of a plurality of acquisition images, the prefiltering also comprises a temporal filtering stage.

11. The method according to claim 1, wherein the local processing of each zone consists of calculating the photon flux detected for each zone of the acquired image, and correcting the bias on each thus-calculated flux value.

12. The method according to claim 11, wherein the flux is calculated using an estimator of maximum likelihood calculated on a specific injection profile of each fibre.

13. The method according to claim 7, wherein, also applying the mask on the parasite background image, and the flux value of each zone of the corresponding background image is subtracted from each flux value of each zone of the acquired image, and a bias correction is carried out on the result of this subtraction.

14. The method according to claim 13, wherein the parasite background comes from the background of the image.

15. The method according to claim 13, wherein the parasite background comes from the calculation of an offset of the detection chain.

16. The method according to claim 11, wherein the bias correction consists of spatially separating the fibres into different blocks, estimating the bias value in each block, interpolating the bias values so as to obtain a bias value for each fibre, and dividing, for each zone, the flux value obtained in the preceding stage by the thus-obtained corresponding bias value.

17. The method according to claim 1, wherein the reconstruction of the acquired image involves a mosaic reconstruction stage.

18. The method according to claim 1, wherein, for the calibration and for each zone of the acquired image, the flux value obtained after local processing is divided by a flux value obtained following an adjustment stage.

19. The method according to claim 18, wherein the adjustment stage consists of:
   isolating each zone of the adjustment image applying the mask, corresponding to the pattern of the fibres, to the adjustment image,
   calculating the photon flux detected for each zone of the adjustment image, and
   correcting the bias on each thus-calculated flux value.

20. The method according to claim 19, wherein the flux is calculated using an estimator of maximum likelihood calculated on the specific injection profile of each fibre.

21. The method according to claim 18, wherein, also applying the mask to the parasite background image, the flux value of each zone of the corresponding background image is subtracted from each flux value of each zone of the adjustment image, and the bias correction is carried out on the result of this subtraction.

22. The method according to claim 21, wherein the parasite background comes from a background of the image.

23. The method according to claim 21, wherein the parasite background comes from a calculation of an offset and from the noise of the detection chain.

24. The method according to claim 17, wherein the mosaic reconstruction stage consists of distributing, over the whole surface of each zone of the acquired image, the flux value of each zone obtained following the calibration stage.

25. The method according to claim 24, wherein a low-pass filtering is carried out so as to make the reconstructed acquired image more regular.

26. The method according to claim 3, wherein the reference image is an image obtained by placing a mirror opposite the guide.

27. The method according to claim 3, wherein the reference image is an image obtained from a homogeneous scattering medium.

28. The method according to claim 3, wherein the reference image is an image obtained from a homogeneous fluorescent medium.

29. The method according to claim 3, wherein the reference image is an image obtained from the backscattering inside the bundle of optical fibres constituting the guide.

30. The method according to claim 3, wherein the reference image is the acquired image.

31. The method according to claim 19, wherein the reference image and the adjustment image are identical.

32. An apparatus for image acquisition using a guide made up of a plurality of optical fibres and for implementing a method for processing an image acquired by means of a guide consisting of the plurality of optical fibres, the apparatus comprising:
   for each optical fibre:
   means for isolating, on the acquired image, a zone corresponding to each optical fibre;
   means for locally processing each zone individually by:
      calculating a flux for each zone on the acquired image,
      calculating a flux for each of a plurality of zones on a set of reference images comprising a parasite background image and an adjustment image, and
      calibrating the fluxes of the acquired image using the fluxes of the set of reference images; and
   means for reconstructing the acquired image from the calibrated fluxes of the acquired image so as to eliminate a pattern due to the optical fibres.

33. The apparatus according to claim 32, wherein the apparatus comprises means for modifying the sampling rate, the quality of injection into the optical fibres, and the setting of a detection chain in order to guarantee an "egg box" profile.

34. The application of the image-processing method according to claim 1 for one of the following fields:
   monitoring of the roughness of the surface of the guide;
   re-setting of the images, or stabilization of the image;
   super-resolution of an acquired image;
   quantization of images; and
   the temporal control of the internal parameters of the acquisition apparatus.

* * * * *